United States Patent
Park et al.

(10) Patent No.: US 11,179,812 B2
(45) Date of Patent: Nov. 23, 2021

(54) APPARATUS AND METHOD FOR INSPECTING WELDING OF SECONDARY BATTERY

(71) Applicant: LG Chem, Ltd., Seoul (KR)

(72) Inventors: Wook Park, Daejeon (KR); Jin Sam Koo, Daejeon (KR); Kwang Soo Jeon, Daejeon (KR); Dong Hyun Lee, Daejeon (KR); Jong Hwa Lee, Daejeon (KR); Hyun Il Park, Daejeon (KR); Hyoen Gu Jeon, Daejeon (KR); Yang Hyun Huh, Daejeon (KR)

(73) Assignee: LG Chem, Ltd.

( * ) Notice: Subject to any disclaimer, the term of this patent is extended or adjusted under 35 U.S.C. 154(b) by 322 days.

(21) Appl. No.: 16/340,507

(22) PCT Filed: Feb. 12, 2018

(86) PCT No.: PCT/KR2018/001848
§ 371 (c)(1),
(2) Date: Apr. 9, 2019

(87) PCT Pub. No.: WO2018/203594
PCT Pub. Date: Nov. 8, 2018

(65) Prior Publication Data
US 2019/0240788 A1     Aug. 8, 2019

(30) Foreign Application Priority Data

May 2, 2017    (KR) .................. 10-2017-0056171

(51) Int. Cl.
*B23K 31/12*    (2006.01)
*B23K 20/26*    (2006.01)
(Continued)

(52) U.S. Cl.
CPC ............ *B23K 31/125* (2013.01); *B23K 20/10* (2013.01); *B23K 20/26* (2013.01); *B23K 31/12* (2013.01); *H01M 50/531* (2021.01)

(58) Field of Classification Search
CPC ...... B23K 31/125; B23K 31/12; B23K 20/26; B23K 20/10–106; B23K 2101/36;
(Continued)

(56) References Cited

U.S. PATENT DOCUMENTS 3,191,441 A * 6/1965 Erickson .............. B23K 11/248
73/432.1
4,525,790 A * 6/1985 Nakamura ................ H03J 7/02
228/102

(Continued)

FOREIGN PATENT DOCUMENTS

CN     1816413 A    8/2006
CN     103071909 A  5/2013
(Continued)

OTHER PUBLICATIONS

International Search Report from PCT/KR2018/001848 dated May 29, 2018.
(Continued)

*Primary Examiner* — Kiley S Stoner
(74) *Attorney, Agent, or Firm* — Lerner, David, Littenberg, Krumholz & Mentlik, LLP

(57) ABSTRACT

An apparatus for inspecting the welding for a secondary battery includes: a measuring unit measuring a power value (P) supplied to the welding apparatus and a taken time (S) when the electrode tab and the electrode lead are welded to each other to obtain measured welding data (Data); an instrument unit obtaining a waveform representing a relationship between the power value (P) and the taken time (S) by using the measured welding data obtained by the mea-
(Continued)

suring unit to display the waveform on a graph; and an inspection unit comparing the measured welding waveform displayed on the graph with a normal welding waveform to inspect whether the defective welding occur in real-time.

9 Claims, 6 Drawing Sheets

(51) Int. Cl.
  *B23K 20/10*    (2006.01)
  *H01M 50/531*   (2021.01)
(58) Field of Classification Search
  CPC ..... B23K 20/002; B23K 1/06; H01M 50/531; Y02E 60/10
  USPC .... 228/1.1, 110.1, 4.5, 180.5, 904, 102–103, 228/105, 8–12
  See application file for complete search history.

(56) References Cited

U.S. PATENT DOCUMENTS

| | | | | |
|---|---|---|---|---|
| 4,558,596 | A * | 12/1985 | McBrearty | B23K 20/10 228/1.1 |
| 4,746,051 | A * | 5/1988 | Peter | B23K 31/125 228/1.1 |
| 4,808,948 | A * | 2/1989 | Patel | H03J 1/0033 331/4 |
| 4,815,001 | A * | 3/1989 | Uthe | B23K 20/004 700/212 |
| 4,970,365 | A * | 11/1990 | Chalco | B23K 1/0056 219/121.63 |
| 5,213,249 | A * | 5/1993 | Long | B23K 20/10 156/580.1 |
| 5,314,105 | A * | 5/1994 | Farassat | B23K 20/10 228/102 |
| 6,198,071 | B1 * | 3/2001 | Kitsunai | B23K 31/12 219/130.01 |
| 6,218,638 | B1 * | 4/2001 | Takano | B23K 11/257 219/110 |
| 6,441,342 | B1 * | 8/2002 | Hsu | B23K 9/091 219/130.01 |
| 6,543,668 | B1 * | 4/2003 | Fujii | B23K 20/023 228/103 |
| 2004/0216829 | A1 | 11/2004 | Gordon | |
| 2006/0260403 | A1 * | 11/2006 | Waschkies | B23K 11/252 73/588 |
| 2007/0199641 | A1 | 8/2007 | Gordon | |
| 2009/0314412 | A1 * | 12/2009 | Gabler | B23K 31/125 156/64 |
| 2010/0280646 | A1 * | 11/2010 | Hesse | B23K 20/005 700/110 |
| 2012/0205359 | A1 * | 8/2012 | Daniel | B23K 9/0953 219/130.01 |
| 2013/0105556 | A1 * | 5/2013 | Abell | G05B 1/00 228/1.1 |
| 2013/0105557 | A1 | 5/2013 | Spicer et al. | |
| 2015/0330952 | A1 * | 11/2015 | Simon | B23K 31/125 73/588 |
| 2016/0178581 | A1 * | 6/2016 | Todorov | B23K 9/173 324/240 |
| 2016/0354974 | A1 * | 12/2016 | Wang | B23K 20/106 |
| 2017/0157714 | A1 | 6/2017 | Spicer et al. | |
| 2019/0210159 | A1 * | 7/2019 | Endoh | B23K 11/0026 |
| 2020/0035642 | A1 * | 1/2020 | Egusa | B06B 3/00 |
| 2020/0203961 | A1 * | 6/2020 | Flowers | H02J 7/00041 |
| 2020/0303787 | A1 * | 9/2020 | Machida | G01R 31/389 |
| 2020/0361023 | A1 * | 11/2020 | Nakagawa | G01N 33/207 |

FOREIGN PATENT DOCUMENTS

| | | |
|---|---|---|
| CN | 103928652 A | 7/2014 |
| CN | 203900727 U | 10/2014 |
| DE | 3429776 A1 | 2/1986 |
| JP | H11030382 A | 2/1999 |
| JP | H11047975 A | 2/1999 |
| JP | 3444233 B2 | 9/2003 |
| JP | 2005271028 A | 10/2005 |
| JP | 2014184981 A | 10/2014 |
| KR | 20120096621 A | 8/2012 |
| KR | 20130036104 A | 4/2013 |
| KR | 101452585 B1 | 10/2014 |
| KR | 20140141289 A | 12/2014 |
| KR | 101482767 B1 | 1/2015 |
| KR | 20150033268 A | 4/2015 |
| KR | 20150044226 A | 4/2015 |
| KR | 20150144478 A | 12/2015 |
| KR | 20160009132 A | 1/2016 |
| KR | 20160069188 A | 6/2016 |
| KR | 101678662 B1 | 11/2016 |
| WO | WO-2018203594 A1 * | 11/2018 ............. B23K 20/10 |

OTHER PUBLICATIONS

Extended European Search Report including Written Opinion for Application No. EP18794506.8 dated Nov. 18, 2019.
Chinese Search Report for Application No. 2018800045297, dated Nov. 13, 2020, 3 pages.
Chinese Search Report for Application No. 2018800045297, dated Apr. 23, 2021, 2 pages.

* cited by examiner

APPARATUS AND METHOD FOR INSPECTING WELDING OF SECONDARY BATTERY

CROSS-REFERENCE TO RELATED APPLICATION

The present application is a national phase entry under 35 U.S.C. § 371 of International Application No. PCT/KR2018/001848 filed on Feb. 12, 2018, which claims priority from Korean Patent Application No. 10-2017-0056171, filed on May 2, 2017, which is hereby incorporated herein by reference in their entireties.

TECHNICAL FIELD

The present invention relates to an apparatus and method for inspecting welding of a secondary battery, and more particularly, to an apparatus and method for inspecting a welded state of a secondary battery in real-time through power P and a time S, which occur during welding.

BACKGROUND ART

In general, secondary batteries are chargeable and dischargeable unlike primary batteries that are not chargeable and are widely used in electronic devices such as mobile phones, notebook computers, camcorders, electric vehicles, and the like.

Such a secondary battery includes an electrode assembly including an electrode tab, an electrode lead coupled to the electrode tab, and a case accommodating the electrode assembly in a state in which a front end of the electrode lead is withdrawn to the outside.

Here, the electrode tab and the electrode lead are coupled to each other through welding. Particularly, the welded state between the electrode tab and the electrode lead is inspected while a product is produced.

However, the inspection of the welded state between the electrode tab and the electrode lead is manually performed. As a result, required manpower and time increase, accurate inspection is difficult, and reliability of the inspection of the welding deteriorates.

DISCLOSURE OF THE INVENTION

Technical Problem

The present invention has been made to solve the above-described problems, an object of the present invention is to provide an apparatus and method for inspecting welding of a secondary battery, in which a welded state is inspected in real-time through power P and a time S, which occurs during welding to perform accurate inspection and significantly reduce manpower, time, cost, which are required for evaluating quality after the welding, thereby improving reliability.

Technical Solution

To achieve the above-described object, an apparatus for inspecting welding for a secondary battery, which inspects whether defective welding occurs in a welding apparatus that welds overlapping portions of an electrode tab and an electrode lead to each other by using electrical energy, according to an embodiment of the present invention includes: a measuring unit measuring a power value (P) supplied to the welding apparatus and a taken time (S) when the electrode tab and the electrode lead are welded to each other to obtain measured welding data (Data); an instrument unit obtaining a waveform representing a relationship between the power value (P) and the taken time (S) by using the measured welding data obtained by the measuring unit to display the waveform on a graph; and an inspection unit comparing the measured welding waveform displayed on the graph with a normal welding waveform to inspect whether the defective welding occur in real-time.

The measuring unit may repeatedly measure the power value (P) supplied to the welding apparatus in units of 5 ms when the electrode tab and the electrode lead are welded to each other to obtain 60 pieces to 100 pieces of measured welding data (Data).

The instrument unit may display 60 pieces to 100 pieces of measured welding data obtained by the measuring unit on the graph and connects 60 pieces to 100 pieces of measured welding data to each other to obtain the measured welding waveform.

The inspection unit may determine the welding as normal welding when the measured welding waveform displayed on the graph is disposed within a set range and determine the welding as defective welding when the measured welding waveform is disposed out of the set range.

The inspection unit may determine the welding as an excessively welded defect when the measured welding waveform has a waveform in which a width of the power value (P) is greater than that of a power value in the normal welding waveform, and a width of the time (S) is less than that of a time in the normal welding waveform.

The inspection unit may determine the welding as a weakly welded defect when the measured welding waveform has a waveform in which a width of the power value (P) is less than that of a power value in the normal welding waveform, and a width of the time (S) is greater than that of a time in the normal welding waveform.

The welding apparatus may include a power source unit supplying the electrical energy, a converting unit converting the electrical energy supplied from the power source unit into vibration energy, and a welding unit performing ultrasonic welding on the overlapping portions of the electrode tab and the electrode lead by using vibration energy converted by the converting unit, and the measuring unit may measure the power value (P) of the electrical energy supplied from the power source unit to the converting unit.

A method for inspecting welding for a secondary battery by using the apparatus for inspecting the welding for the secondary battery includes: a welding step (S10) of welding and connecting overlapping portions of an electrode tab and an electrode lead to each other; a measuring step (S20) of measuring a supplied power value (P) and a taken time (S) when the electrode tab and the electrode lead are welded to each other to obtain measured welding data (Data); an instrument step (S30) of obtaining a waveform representing a relationship between the power value (P) and the taken time (S) by using the measured welding data to display the waveform on a graph; and an inspection step (S40) of comparing the measured welding waveform displayed on the graph with a normal welding waveform to inspect whether defective welding occurs.

In the measuring step (S20), the power value (P) may be repeatedly measured in units of 5 ms when the electrode tab and the electrode lead are welded to each other to obtain 60 pieces to 100 pieces of measured welding data (Data).

In the instrument step (S30), 60 pieces to 100 pieces of measured welding data obtained in the measuring step (S20)

may be displayed on the graph and connected to each other to obtain the measured welding waveform.

In the inspection step (S40), the welding may be determined as normal welding when the measured welding waveform displayed on the graph is disposed within a set range and is determined as defective welding when the measured welding waveform is disposed out of the set range.

In the inspection step (S40), the welding may be determined as an excessively welded defect when the measured welding waveform has a waveform in which a width of the power value (P) is greater than that of a power value in the normal welding waveform, and a width of the time (S) is less than that of a time in the normal welding waveform.

In the inspection step (S40), the welding may be determined as a weakly welded defect when the measured welding waveform has a waveform in which a width of the power value (P) is less than that of a power value in the normal welding waveform, and a width of the time (S) is greater than that of a time in the normal welding waveform.

Advantageous Effects

The present invention has effects as follows.

First: the apparatus for inspecting the welding for the secondary battery according to the present invention may obtain the measured welding waveform through the power P and the time S, which occur during the welding, and simply and accurately inspect the defective welding in real-time by comparing the measured welding waveform with the normal welding waveform to significantly reduce the required manpower and time and enable accurate inspection, thereby improving reliability.

Second: in the apparatus for inspecting the welding for the secondary battery according to the present invention, the measuring unit may repeatedly measure the power value P supplied in units of 5 ms during the welding to obtain 60 pieces to 100 pieces of measured welding data (Data), thereby obtaining a more accurate measured welding data.

Third: in the apparatus for inspecting the welding for the secondary battery according to the present invention, the instrument unit may connect 60 pieces to 100 pieces of measured welding data (Data), which are obtained by the measuring unit, to each other to obtain the measured welding waveform and thus to more accurately compare the measured welding waveform with the normal welding waveform, thereby accurately inspecting the welded state.

Fourth: in the apparatus for inspecting the welding for the secondary battery according to the present invention, the measuring unit may measure the power value P of the electrical energy supplied from the power source unit to the converting unit of the welding apparatus to accurately measure the power value P, thereby more accurately inspecting the welded state, i.e., whether the welding is normal or defective, in real-time.

MODE FOR CARRYING OUT THE INVENTION

Figure 1:
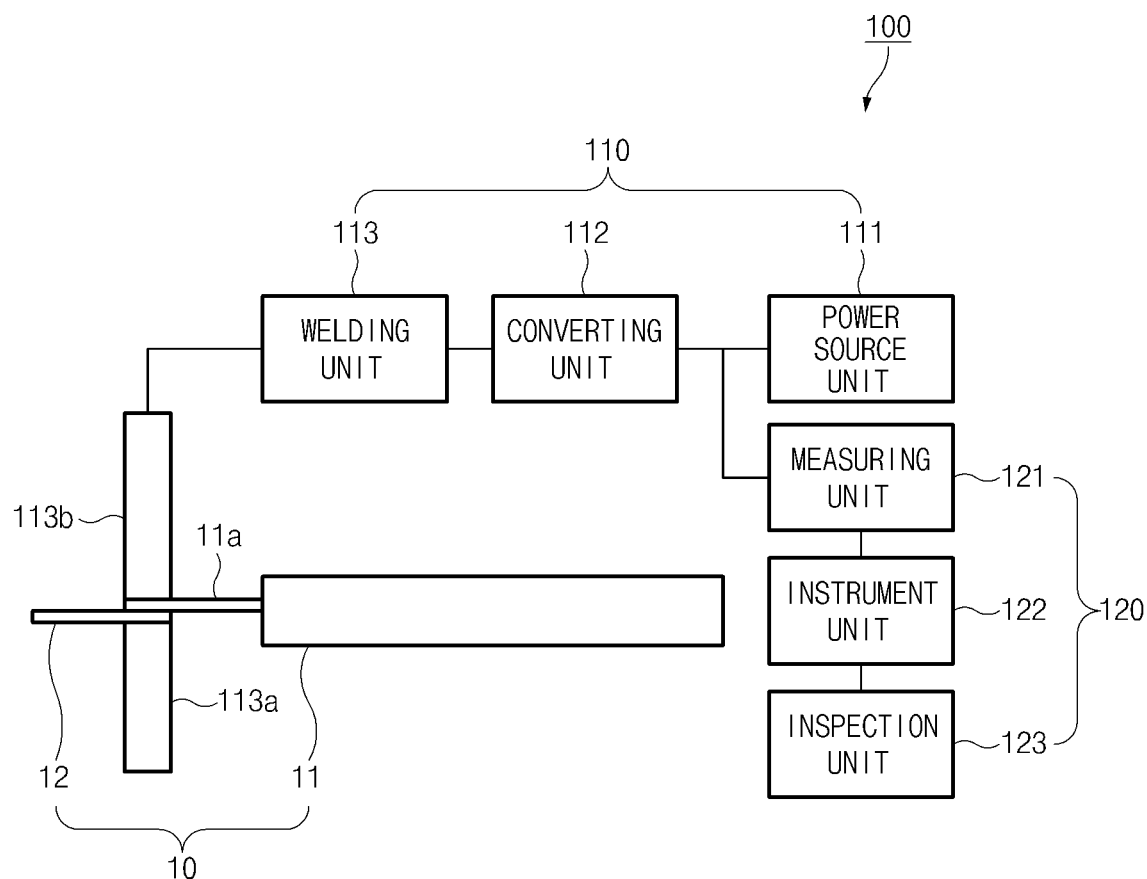
FIG. 1 is a view of an apparatus for inspecting welding for a secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Referring to FIG. 1, a secondary battery 10 includes an electrode assembly 11 including an electrode tab 11a, an electrode lead 12 coupled to the electrode tab 11a, and a case (not shown) accommodating the electrode assembly 11 in a state in which a front end of the electrode lead 12 is withdrawn to the outside.

Here, after the electrode tab 11a and the electrode lead 12 are welded to be coupled to each other, the welded state is inspected. Here, a welding system 100 for a secondary battery according to an embodiment of the present invention is used.

[Welding System for Secondary Battery According to an Embodiment]

As illustrated in FIG. 1, the welding system 100 for the secondary battery according to an embodiment of the present invention includes a welding apparatus 110 that converts electrical energy into vibration energy to weld overlapping portions of the electrode tab 11a and the electrode lead 12 and an apparatus 120 for inspecting the welding, which inspects a welded state (i.e., normal welding, excessive welding, and weak welding) of the welded portion between the electrode tab 11a and the electrode lead 12 in real-time.

The welding apparatus 110 is configured to weld the overlapping portions of the electrode tab and the electrode lead and includes a power source unit 111 supplying electrical energy, a converting unit 112 converting the electrical energy supplied from the power source unit 111 into vibration energy, and a welding unit 113 performing ultrasonic welding on the overlapping portions of the electrode tab 11a and the electrode lead 12 by using the vibration energy converted by the converting unit 112.

Here, the welding unit 113 includes an anvil 113a supporting one side surface of the overlapping portions of the electrode tab 11a and the electrode lead 12 and a horn 113b pressing the other side surface and performing the ultrasonic welding on the overlapping portions of the electrode tab 11a and the electrode lead 12 by using the vibration energy.

In the welding apparatus 110 having the above-described constituents, the overlapping portions of the electrode tab 11a and the electrode lead 12 are press-fitted between the anvil 113a and the horn 113b of the welding unit 113. Then, the electrical energy is supplied to the horn 113b of the welding unit 113 through the power source unit 111. Here, the electrical energy supplied to the horn 113b is converted into the vibration energy while passing through the converting unit 112, and the horn 113b performs the ultrasonic welding on the overlapping portions of the electrode tab 11a and the electrode lead 12 by using the vibration energy.

The apparatus 120 for inspecting the welding is configured to inspect the welded state between the electrode tab and the electrode lead, which are welded to each other by the welding apparatus and particularly inspects the welded state between the electrode tab and the electrode lead in real-time through a power value P supplied to the welding apparatus and a taken time S.

That is, the apparatus 120 for inspecting the welding includes a measuring unit 121 measuring the power value P supplied to the welding apparatus 110 and the taken time S to obtain measured welding data, an instrument unit 122 obtaining a measured welding waveform A on the basis of the measured welding data obtained by the measuring unit 121, and an inspection unit 123 comparing the measured welding waveform A obtained by the instrument unit 122 with a normal welding waveform B to inspect the welded state in real-time.

The measuring unit 121 measures the power value P supplied to the welding apparatus 110 and a predetermined time S when the electrode tab 11a and the electrode lead 12 are welded to each other to obtain measured welding data (Data).

In more detail, the welding apparatus 110 requires a predetermined power value P and a predetermined time S when the overlapping portions of the electrode tab 11a and the electrode lead 12 are welded to each other. Here, the measuring unit 121 continuously measures the power value P supplied to the welding apparatus 110 in units of the predetermined time S to obtain a plurality of pieces of measured welding data (Data).

For example, the measuring unit 121 may repeatedly measure the power value P supplied to the welding apparatus 110 in units of 5 ms when the electrode tab 11a and the electrode lead 12 are welded to each other to obtain 60 pieces to 100 pieces of measured welding data (Data).

The measuring unit 121 measures the power value P of the electrical energy supplied from the power source unit 111 to the converting unit 112. That is, the measuring unit 121 may measure the power value P of the electrical energy between the power source unit 111 and the converting unit 112, which is a section in which a loss of the electrical energy does not occur, and thus more accurately measures the power value P.

The instrument unit 122 obtains a waveform representing a relationship between the power value P and the taken time S by using the measured welding data obtained by the measuring unit 121 to display the waveform on a graph.

Figure 2:
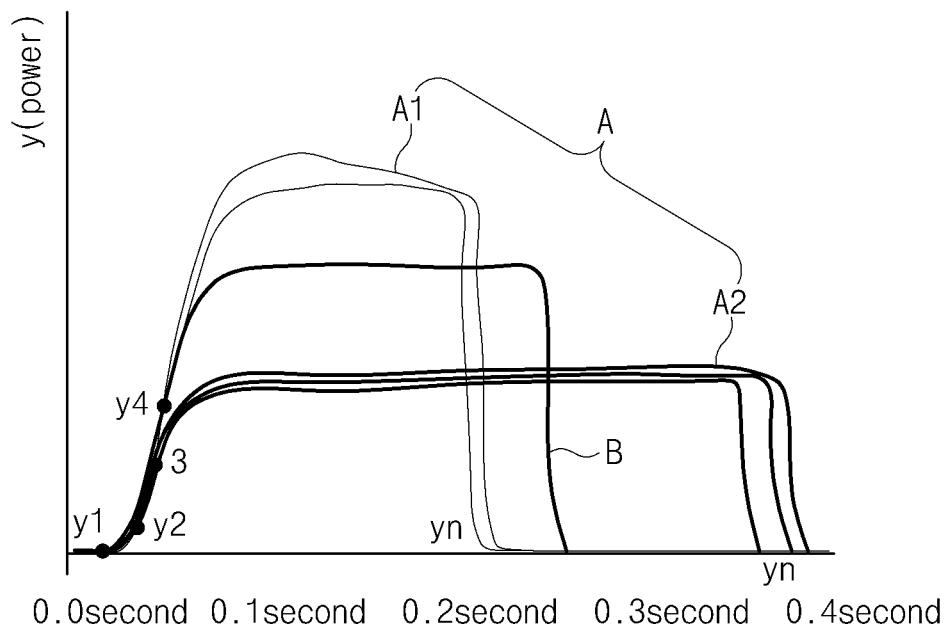
FIG. 2 is a graph illustrating a measured welding waveform and a normal welding waveform, which are obtained by the apparatus for inspecting the welding for the secondary battery according to an embodiment of the present invention.

That is, referring to the graph of FIG. 2, the instrument unit 122 may display the waveform by using the measured welding data obtained by the measuring unit 121 on the graph of which a lower portion represents the taken time S, and an upper portion represents the power value P.

For example, the instrument unit 122 may continuously display 60 pieces to 100 pieces of measured welding data y1, y2, y3, . . . , and yn, which are obtained by the measuring unit 121 on the graph, and then, when displayed points are connected to each other, the measured welding waveform A may be obtained. Here, in the measured welding waveform A, a measured welding waveform A1 in which a power value P-side width is large and a measured welding waveform A2 in which a taken time S-side width is large may be obtained.

The inspection unit 123 compares the measured welding waveform A displayed on the graph with the normal welding waveform B to inspect whether the welding is defective in real-time.

That is, the inspection unit 123 determines the welding as a normal welding when the measured welding waveform A displayed on the graph is disposed within a set range and determines the welding as a defective welding when the measured welding waveform is disposed out of the set range.

That is, the inspection unit 123 may utilize the measured welding waveform displayed on the graph by using a statistical analysis solution to compare the measured welding waveform with the normal welding waveform, thereby inspecting a defective welding. In addition, the inspection unit 123 calculates welding energy and a welding time from the measured waveform to determine the welding as a normal welding when the calculated welding energy and welding time are within the set range and determine the welding as a defective welding when the calculated welding energy and welding time are out of the set range.

For example, the inspection unit 123 determines the welding as an excessively welded defect when the measured welding waveform has a waveform A1 in which a width of the power value P is greater than that of a power value in the normal welding waveform B, and a width of the time S is less than that of a time in the normal welding waveform B and determines the welding as a weakly welded defect when the measured welding waveform has a waveform A2 in which a width of the power value P is less than that of a power value in the normal welding waveform B, and a width of the time S is greater than that of a time in the normal welding waveform B.

The inspection unit 123 may determine the welding as defective when a portion of the measured welding waveform A has an irregular amplitude such as a wave form, a saw tooth form, and an uneven form even though the measured welding waveform A is disposed within the set range of the normal welding waveform B.

For example, when the electrical energy supplied to the horn 113b of the welding unit 113 through the power source unit 111 is irregularly supplied for a predetermined time, the instrument unit 122 displays a measured welding waveform A in which a waveform in a section in which the electrical energy is irregularly supplied has a predetermined amplitude (one of the wave form, the saw tooth form, and the uneven form). When the measured welding waveform A as described above occurs, the inspection unit 123 determines the welding as the defective welding even though the measured welding waveform A is disposed within the set range of the normal welding waveform B. In the apparatus for inspecting the welding, which includes the above-described constituents, the present welded state between the electrode tab and the electrode lead may be easily confirmed through only the measured welding waveform displayed on the graph. Therefore, the time and manpower, which are required for inspecting the welding, may be significantly reduced, and the accurate inspection may be enabled to improve reliability.

[Method for Inspecting Secondary Battery According to an Embodiment]

Hereinafter, a method for inspecting a secondary battery according to an embodiment of the present invention will be described.

Figure 3:
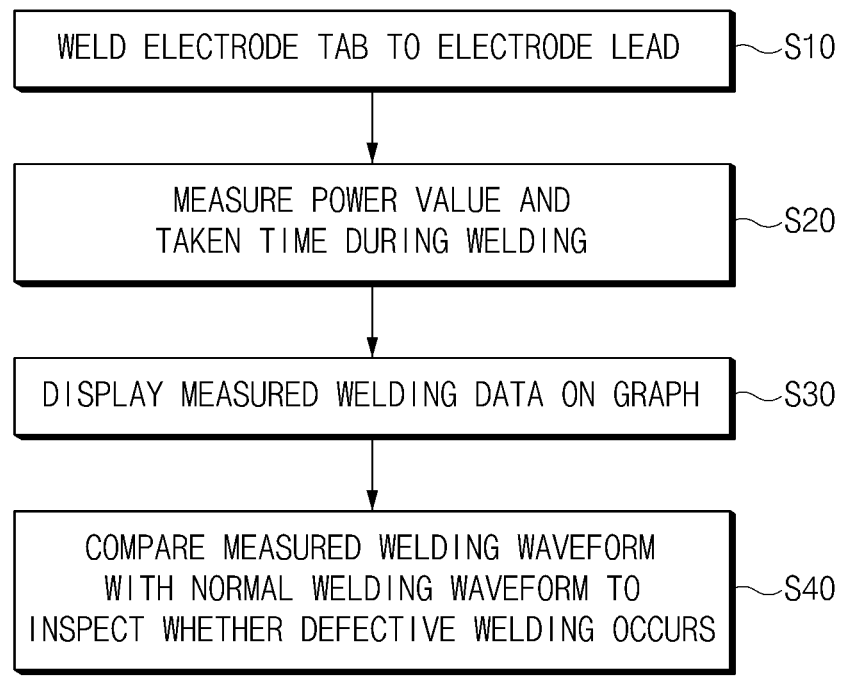
FIG. 3 is a flowchart illustrating a method for inspecting welding for a secondary battery according to an embodiment of the present invention.

As illustrated in FIG. 3, the method for inspecting the secondary battery according to an embodiment of the present invention includes a welding step (S10) of welding and connecting overlapping portions of an electrode tab 11a and an electrode lead 12 to each other, a measuring step (S20) of measuring a supplied power value P and a taken time S when the electrode tab 11a and the electrode lead 12 are welded to each other to obtain measured welding data (Data), an instrument step (S30) of obtaining a waveform representing a relationship between the power value P and the taken time S by using the measured welding data to display the waveform on a graph, and an inspection step (S40) of comparing the measured welding waveform A displayed on the graph with a normal welding waveform B to inspect a welded state.

In the welding step (S10), the overlapping portions of the electrode tab 11a and the electrode lead 12 are welded to each other by using a welding apparatus 110. In more detail, a welding unit 113 press-fits the overlapping portions of the electrode tab 11a and the electrode lead 12 between an anvil 113a and a horn 113b. In this state, a power source unit 111 supplies electrical energy to the horn 113b. Here, the electrical energy of the power source unit 111 is converted into vibrational energy while passing through a converting unit 112, and the horn 113b performs ultrasonic welding on the overlapping portions of the electrode tab 11a and the electrode lead 12 through the vibrational energy passing through the converting unit 112.

In the measuring step (S20), the power value P of the electrical energy supplied from the power source unit 111 to the converting unit 112 and the taken time S are measured through a measuring unit 121 of the apparatus 120 for inspecting the welding to obtain measured welding data Data. That is, the measuring unit 121 repeatedly measures the power value P supplied from the power source unit 111 to the converting unit 112 in units of 5 ms when the electrode tab 11a and the electrode lead 12 are welded to each other to obtain 60 pieces to 100 pieces of measured welding data (Data).

In the measuring step (S30), the measured welding data (Data) obtained in the measuring step (S20) is displayed on the graph to obtain a measured welding waveform A through the instrument unit 122 of the apparatus 120 for inspecting the welding. That is, in the instrument step (S30), 60 pieces to 100 pieces of measured welding data (Data), which are obtained in the measuring step (S20), are displayed as y1, y2, y3, . . . , and yn and then connected to each other to obtain the measured welding waveform A.

In the inspection step (S40), the measured welding waveform in the measuring step (S30), which is displayed on the graph, and a previously displayed normal welding waveform B are compared with each other to inspect whether the welding is defective in real-time through an inspection unit 123 of the apparatus 120 for inspecting the welding.

That is, the inspection unit 123 determines the welding as an excessively welded defect when the measured welding waveform has a waveform A1 in which a width of the power value P is greater than that of a power value in the normal welding waveform, and a width of the time S is less than that of a time in the normal welding waveform and determines the welding as a weakly welded defect when the measured welding waveform has a waveform A2 in which a width of the power value P is less than that of a power value in the normal welding waveform B, and a width of the time S is greater than that of a time in the normal welding waveform B.

In the method for inspecting the welding for the secondary battery according to an embodiment of the present invention, the welded state may be confirmed in real-time through only the supplied power value P and the time S taken to perform the welding, and thus, accurate inspection and reliability may be improved.

Experimental Example

In the method for inspecting the welding for the secondary battery according to an embodiment of the present invention, the welded state may be easily confirmed through only the power value P and the taken time S. Whether the welded state confirmed as described above is correct may be proved through the following experiments.

Figure 4:
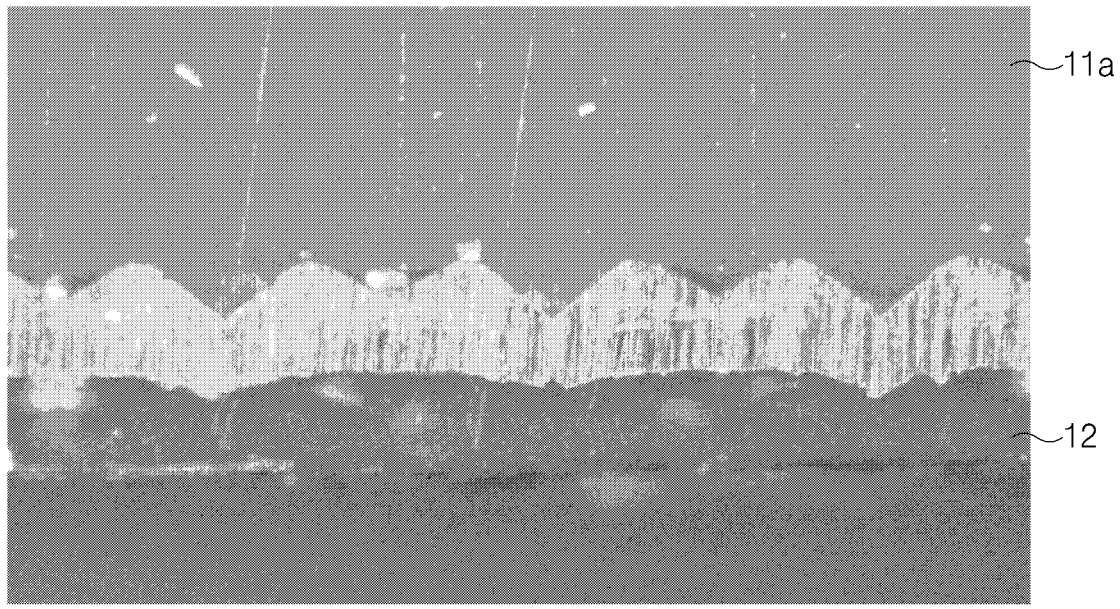
FIG. 4 is a cross-sectional photograph illustrating a normally welded state between an electrode tab and an electrode lead according to the present invention.

FIG. 4 is a cross-sectional photograph illustrating the normally welded state between the electrode tab and the electrode lead according to the present invention. That is, it is seen that a peak between the electrode lead and the electrode tab has a convexly curved shape, and a gap does not occur between the electrode lead and the electrode tab.

Figure 5:
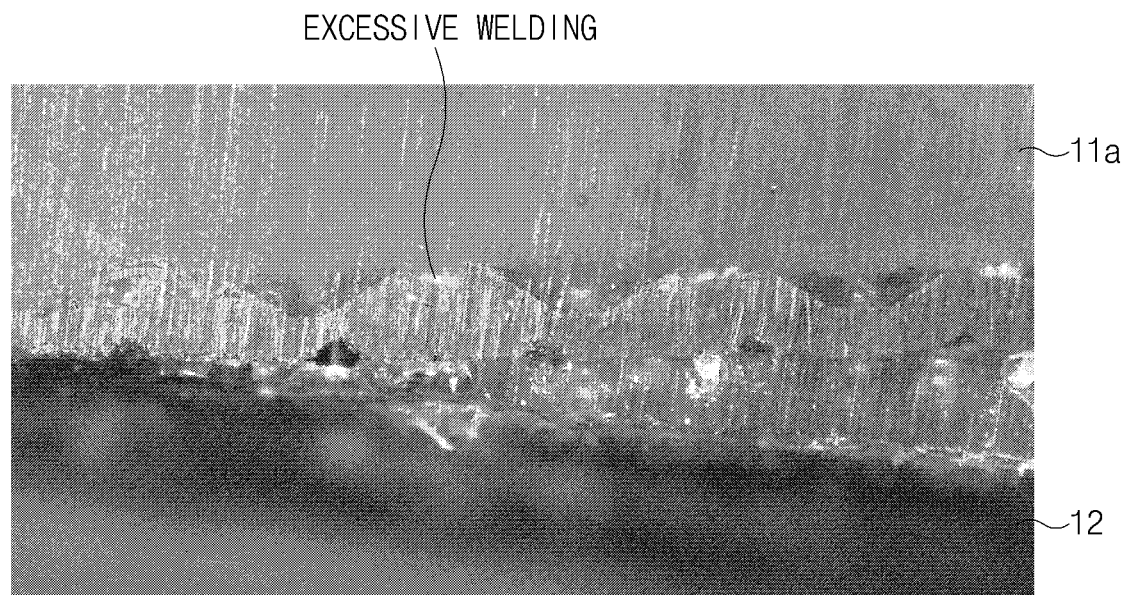
FIG. 5 is a cross-sectional photograph illustrating an excessively welded state between the electrode tab and the electrode lead according to the present invention.

FIG. 5 is a cross-sectional photograph illustrating the excessively welded state between the electrode tab and the electrode lead according to the present invention. That is, it is seen that a peak between the electrode lead and the electrode tab is large, and excessive welding occurs at a side of the electrode tab.

Figure 6:
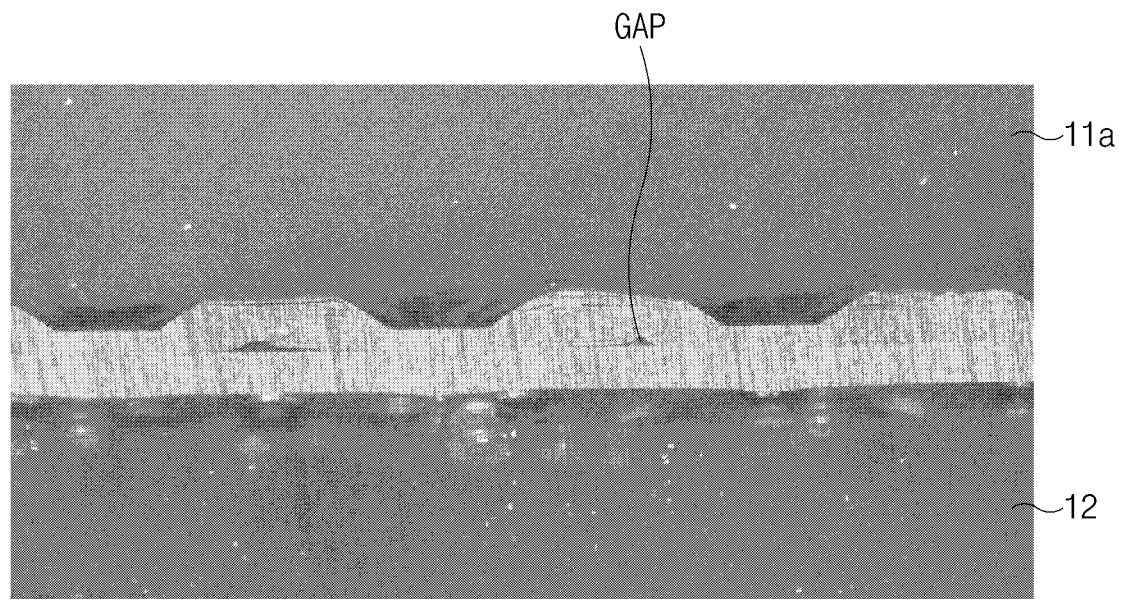
FIG. 6 is a cross-sectional photograph illustrating a weakly welded state between the electrode tab and the electrode lead according to the present invention.

FIG. 6 is a cross-sectional photograph illustrating the weakly welded state between the electrode tab and the electrode lead according to the present invention. That is, it is seen that a peak between the electrode lead and the electrode tab is small, and the electrode lead and the electrode tab are not welded to each other because a gap occurs between the electrode lead and the electrode tab.

Thus, according to the present invention, the welded state may be accurately inspected by using the waveform representing the power value P and the taken time S, which occur during welding, through the above-described experiments.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for inspecting welding for a secondary battery, which is configured to inspect whether a defective welding occurs in a welding apparatus that welds overlapping portions of an electrode tab and an electrode lead to each other by using electrical energy, the apparatus comprising:

a measuring unit configured to measure a power value (P) supplied to the welding apparatus and a taken time (S) when the electrode tab and the electrode lead are welded to each other to obtain measured welding data (Data);

an instrument unit configured to obtain a waveform representing a relationship between the power value (P) and the taken time (S) by using the measured welding data obtained by the measuring unit to display the waveform on a graph; and an inspection unit configured to compare the measured welding waveform displayed on the graph with a normal welding waveform to inspect, in real-time, whether a defective welding occurred, wherein the inspection unit is configured to determine the welding as an excessively welded defect when the measured welding waveform has a shape in which a plateau of the power value (P) without substantial loss is greater than that of plateau of a power value without substantial loss in the normal welding waveform, and the time (S) during the plateau of the power value (P) is less than that of a time during the plateau of the power value in the normal welding waveform, and wherein the inspection unit is configured to determine the welding as a weakly welded defect when the measured welding waveform has a shape in which a plateau of the power value (P) without substantial loss is less than that of plateau of a power value without substantial loss in the normal welding waveform, and the time (S) during the plateau of the power value (P) is greater than that of a time during the plateau of the power value in the normal welding waveform.

2. The apparatus of claim 1, wherein the measuring unit repeatedly measures the power value (P) supplied to the welding apparatus in units of 5 ms when the electrode tab and the electrode lead are welded to each other to obtain 60 pieces to 100 pieces of measured welding data (Data).

3. The apparatus of claim 2, wherein the instrument unit displays 60 pieces to 100 pieces of measured welding data obtained by the measuring unit on the graph and connects 60 pieces to 100 pieces of measured welding data to each other to obtain the measured welding waveform.

4. The apparatus of claim 3, wherein the inspection unit determines the welding as normal welding when the measured welding waveform displayed on the graph is disposed within a set range and determines the welding as defective welding when the measured welding waveform is disposed out of the set range.

5. The apparatus of claim 1, wherein the welding apparatus comprises a power source unit supplying the electrical energy, a converting unit converting the electrical energy supplied from the power source unit into vibration energy, and a welding unit performing ultrasonic welding on the overlapping portions of the electrode tab and the electrode lead by using the vibration energy converted by the converting unit, and the measuring unit measures the power value (P) of the electrical energy supplied from the power source unit to the converting unit.

6. A method for inspecting welding for a secondary battery, the method comprising:

a welding step (S10) of welding and connecting overlapping portions of an electrode tab and an electrode lead to each other;

a measuring step (S20) of measuring a supplied power value (P) and a taken time (S) when the electrode tab and the electrode lead are welded to each other to obtain measured welding data (Data);

an instrument step (S30) of obtaining a waveform representing a relationship between the power value (P) and the taken time (S) by using the measured welding data to display the waveform on a graph; and an inspection step (S40) of comparing the measured welding waveform displayed on the graph with a normal welding waveform to inspect whether defective welding occurs, wherein, in the inspection step (S40), the welding is determined as an excessively welded defect when the measured welding waveform has a shape in which a plateau of the power value (P) without substantial loss is greater than that of plateau of a power value without substantial loss in the normal welding waveform, and the time (S) during the plateau of the power value (P) is less than that of a time during the plateau of the power value in the normal welding waveform, and wherein, in the inspection step (S40), the welding is determined as a weakly welded defect when the measured welding waveform has a shape in which a plateau of the power value (P) without substantial loss is less than that of plateau of a power value without substantial loss in the normal welding waveform, and the time (S) during the plateau of the power value (P) is greater than that of a time during the plateau of the power value in the normal welding waveform.

7. The method of claim 6, wherein, in the measuring step (S20), the power value (P) is repeatedly measured in units of 5 ms when the electrode tab and the electrode lead are welded to each other to obtain 60 pieces to 100 pieces of measured welding data (Data).

8. The method of claim 7, wherein, in the measuring step (S20), 60 pieces to 100 pieces of measured welding data obtained in the measuring step (S20) are displayed on the graph and connected to each other to obtain the measured welding waveform.

9. The method of claim 8, wherein, in the inspection step (S40), the welding is determined as normal welding when the measured welding waveform displayed on the graph is disposed within a set range and is determined as defective welding when the measured welding waveform is disposed out of the set range.

* * * * *